United States Patent [19]
Crook et al.

[11] Patent Number: 5,386,523
[45] Date of Patent: Jan. 31, 1995

[54] ADDRESSING SCHEME FOR ACCESSING A PORTION OF A LARGE MEMORY SPACE

[75] Inventors: Neal A. Crook, Reading, England; Michael J. Seaman, San Jose, Calif.; David L. A. Brash, Reading, England

[73] Assignee: Digital Equipment Corporation, Maynard, Mass.

[21] Appl. No.: 818,607

[22] Filed: Jan. 10, 1992

[51] Int. Cl.⁶ .................... G06F 12/00; G06F 12/06
[52] U.S. Cl. ................. 395/400; 364/DIG. 1; 364/245; 364/247.2; 364/254; 364/254.3; 364/255.1; 364/255.8; 364/259; 364/259.1
[58] Field of Search ......................... 395/400

[56] References Cited

U.S. PATENT DOCUMENTS

| | | |
|---|---|---|
| 4,831,522 | 5/1989 | Henderson et al. ............ 395/400 |
| 5,093,783 | 3/1992 | Kitada ............................ 395/400 |
| 5,109,334 | 4/1992 | Kamuro .......................... 395/400 |
| 5,150,471 | 9/1992 | Tipon ............................. 395/400 |
| 5,210,839 | 5/1993 | Powell et al. ................... 395/400 |

Primary Examiner—Jack B. Harvey
Assistant Examiner—Michael A. Whitfield
Attorney, Agent, or Firm—Kenyon & Kenyon

[57] ABSTRACT

A method for generating an address for addressable locations of a computer system where two registers are overlapped. Those bits of the two registers that overlap are logically combined together using a boolean operation when generating the address. Using this method, the higher order register can be used to select a segment of the addressable space of the computer system. Then, all accesses to that portion of the addressable space can be controlled by changing only the lower order register. This results in a saving of time since only one of the registers need be reloaded for each subsequent access.

14 Claims, 2 Drawing Sheets

FIG. 3

BASE REGISTER – $B_7 B_6 B_5 B_4 B_3 B_2 B_1 B_0$

HIGH REGISTER – $H_{15} H_{14} H_{13} H_{12} H_{11} H_{10} H_9 H_8 H_7 H_6 H_5 H_4 H_3 H_2 H_1 H_0$

LOW REGISTER – $L_{15} L_{14} L_{13} L_{12} L_{11} L_{10} L_9 L_8 L_7 L_6 L_5 L_4 L_3 L_2 L_1 L_0$

ADDRESS 31 30 29 28 27 26 25 24 23 22 21 20 19 18 17 16 15 14 13 12 11 10 9 8 7 6 5 4 3 2 1 0

$B_7 B_6 B_5 B_4 B_3 B_2 B_1 B_0 H_{15} H_{14} H_{13} H_{12} H_{11} H_{10} H_9 H_8 H_7 H_6 H_5 H_4 H_3 H_2 H_1 H_0$ 0 0 0 0 0 0 0 0 $L_{15} L_{14} L_{13} L_{12} L_{11} L_{10} L_9 L_8 L_7 L_6 L_5 L_4 L_3 L_2 L_1 L_0$

ADDRESSING SCHEME FOR ACCESSING A PORTION OF A LARGE MEMORY SPACE

FIELD OF THE INVENTION

The present invention is directed to a method and apparatus for generating an address for a computer memory. More particularly, the present invention provides a method and apparatus which combines the content of two or more address registers to generate a full address for efficient access to different areas of a computer memory.

BACKGROUND OF THE INVENTION

Computer memories are arranged into a plurality of addressable locations with each location utilized to store data. In order to access a location to read or write data at the location, an address corresponding to the location must be generated and input to the memory. As should be understood, a memory address must comprise a number of bits that is sufficient to uniquely identify each location of the memory. For example a 64 Kbyte RAM requires a 16 bit address to uniquely identify each memory location. As the memory capacity of modern computer systems expands, the number of bits required for the addresses used to access data has increased, as well. For instance, modern backplane bus based computer systems typically define an address space that encompasses all of the memory locations provided by all of the components coupled to the backplane bus. In this manner, each processor of the system can generate addresses for direct access to all of the memory locations available in the system.

However, when each processor of the system has a 64 Kbyte RAM local memory, a 16 bit address is sufficient for access to the locations of the local memory, as discussed above. Thus, each processor may include 16 line internal address busses, yet must generate a 32 bit address for access to non-local memory locations. In order to accommodate the disparity between local address bus size and the address size of a backplane bus address space, end-to-end registers are utilized to select an address within the 32 bit bus address space.

For example, two 16 bit registers arranged end-to-end can be used to transfer a 32 bit address from the 16 bit internal address bus to the 32 address lines of the backplane bus. The processor generates the first 16 high order bits of a 32 bit address and stores these bits in a first or high register. Thereafter, the processor generates the second 16 low order bits and stores these bits in a second or low register. The end-to-end arrangement of the two registers enables all 32 of the bits stored therein to be simultaneously transferred to the 32 address lines of the bus. However, as should be understood, the processor must generate two address segments and perform two register writes to transfer a 32 bit address to the backplane bus.

In another example, each processor of the system may be utilizing a 12 bit local memory address yet require a 16 bit bus address. In this instance, the high register can be arranged to store the 4 highest order bits of the 16 bit bus address with the remaining 12 low order bits being stored in a 12 bit low register. Thus, the 16 bit bus address is formed by concatenating the 4 bits of the high register with the 12 bits of the low register.

The end-to-end register arrangement can be used efficiently when a processor is accessing a number of memory locations within an area of the address space defined by the high order bits of the bus address. Under these circumstances, the processor need only generate and store the 16 low order bits for subsequent accesses to the area of the address space defined by the 16 high order bits in the 32 bit bus address example. The 16 high order bits are stored in the high register upon the first memory access operation to the area of the address space defined by the 16 high order bits and are reused so long as the processor continues to access memory locations within that particular area of the address space. The 16 low order bits for subsequent memory accesses define an offset within the particular area of the address space that locates the desired memory location. Similarly, in the 12 bit local address to 16 bit bus address example, the 4 bit register can be used to select a particular area of the address space with the 12 bit register being used to define an offset within the selected area during accesses to that particular area.

To summarize, a processor need only generate and store low order bits of an address when it is accessing locations within an area of the total memory that is defined by an n bit segment of the bus address if n equals the number of bits stored in the high register. This, however, imposes a limit to the efficiency provided by the end-to-end register arrangement.

The fixed size of the high register fixes the size of the area of the total memory that can be segmented for single register load operation. For example, when the processor is frequently accessing locations within an area of the address space that is defined by a number of bits that is less than the size of the high register, the processor must continue to generate the two segments of the bus address because the bits of the high register that are not used to define the particular area of the address space are required for the generation of the offset within that area.

SUMMARY OF THE INVENTION

The present invention is directed to a method and apparatus that increases the flexibility of area segmentation for a system memory address space to increase efficiency in the access of non-local memory locations. The present invention generally comprises a multiple register arrangement for coupling a processor to address lines of a bus wherein at least certain bits of at least two registers are "overlapped". The overlapped bits are logically combined in a boolean operation when generating the complete address for the bus. For example, each pair of overlapped bits can be logically ORed to one another to provide a combined bit for use in generating the bus address.

In this manner, the binary values for certain overlapped bits can be set in one of the registers so that the value of the combined bit is either set by the value of the other overlapped bit or fixed regardless of the value of the other overlapped bit. In the example of a logical OR, when a preselected overlapped bit in the high register is set to a logical 1, the logical combination of the overlapping high and low bits will be a logical 1 regardless of the value of the corresponding overlapped bit of the low register since the logical 1 provided by the high order bit results in an ORed logical 1 whether the other OR input of the respective overlapped low order bit is a logical 1 or logical zero.

On the other hand, when the preselected overlapped bit in the high register is set to a logical zero, the logical combination of the overlapping high and low bits will be a logical 1 when the respective low order bit is a logical 1 and will be a logical zero when the respective low order bit is a logical zero due to the logic inherent in an OR combination.

As should be understood, the value of combined bits can also be fixed by setting the values of overlapped low bits to logical 1's or zeros so that the values of corresponding overlapped high order bits are either irrelevant or determine the value of the combined bit. Thus, the overlapping of certain bits of two address registers provides flexibility in the number of bits in each of the high and low registers used to define a complete bus address.

For example, having determined the precise number n of overlapped high order bits required to specify a preselected area of the total address space, the remaining overlapped high order bits are each always set to logical zeros. The most significant n overlapped low order bits would then also always be set to logical zeros. The remaining low order bits will then determine the offset within the preselected memory area. The size of a next preselected area of the address space can be easily changed by increasing or decreasing the number n of overlapped high order bits.

Moreover, the overlapped high order bits can be used to alias addresses defined by the bit values loaded into the low register by always setting certain ones of the overlapped high order bits to logical 1's. The values of the combined overlapped bits corresponding to the high order bits set at logical 1 will remain logical 1's, as described above, regardless of the values loaded into the low register by the processor. In this manner, the address generating software of a processor can be used to generate bit values for only the low register regardless of what values are loaded into the high register and with the overlapped high order bits always set to logical 1's controlling the combined bit values for those bits. The remaining low order bits of the low register will define an offset in the upper portion of the address segment defined by the high order bits not always set to logical 1's. Thus, the address generating software need not be cognizant of the number of bits required to define an offset.

Thus, the present invention provides a highly flexible register arrangement for generating addresses in a large memory space. The size of a preselected memory area can be set as desired so that a processor need only perform a single register load during reads and writes to the preselected area. In addition, the register arrangement can be used to alias addresses so that the processor can address memory blocks of variable size while continuing to use the addressing scheme of the original address space.

BRIEF DESCRIPTION OF THE DRAWINGS

FIG. 3 is a schematic representation of the generation of a 32 bit address through the combination of three registers arranged according to the present invention.

DETAILED DESCRIPTION

Figure 1:
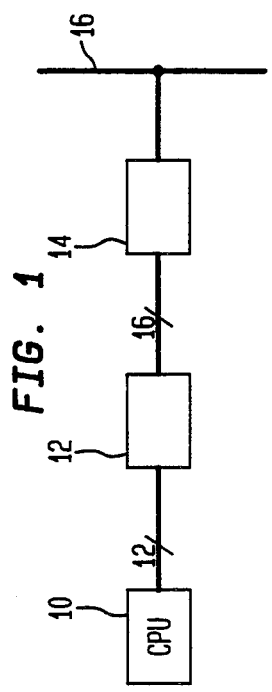
FIG. 1 is a block diagram of a computer coupled to a bus by a register arrangement according to the present invention.

Referring to FIG. 1, a computer/bus system environment for the present invention is shown. A central processing unit (CPU) 10 includes a 12 bit data bus which is used to transfer address data to an address register device 12. The address register device 12, in turn, supplies a 16 bit address to a backplane bus 16 via a bus interface 14. The backplane bus 16 includes 16 address lines and is coupled to additional devices such as computers, memories, and the like.

Figure 2:
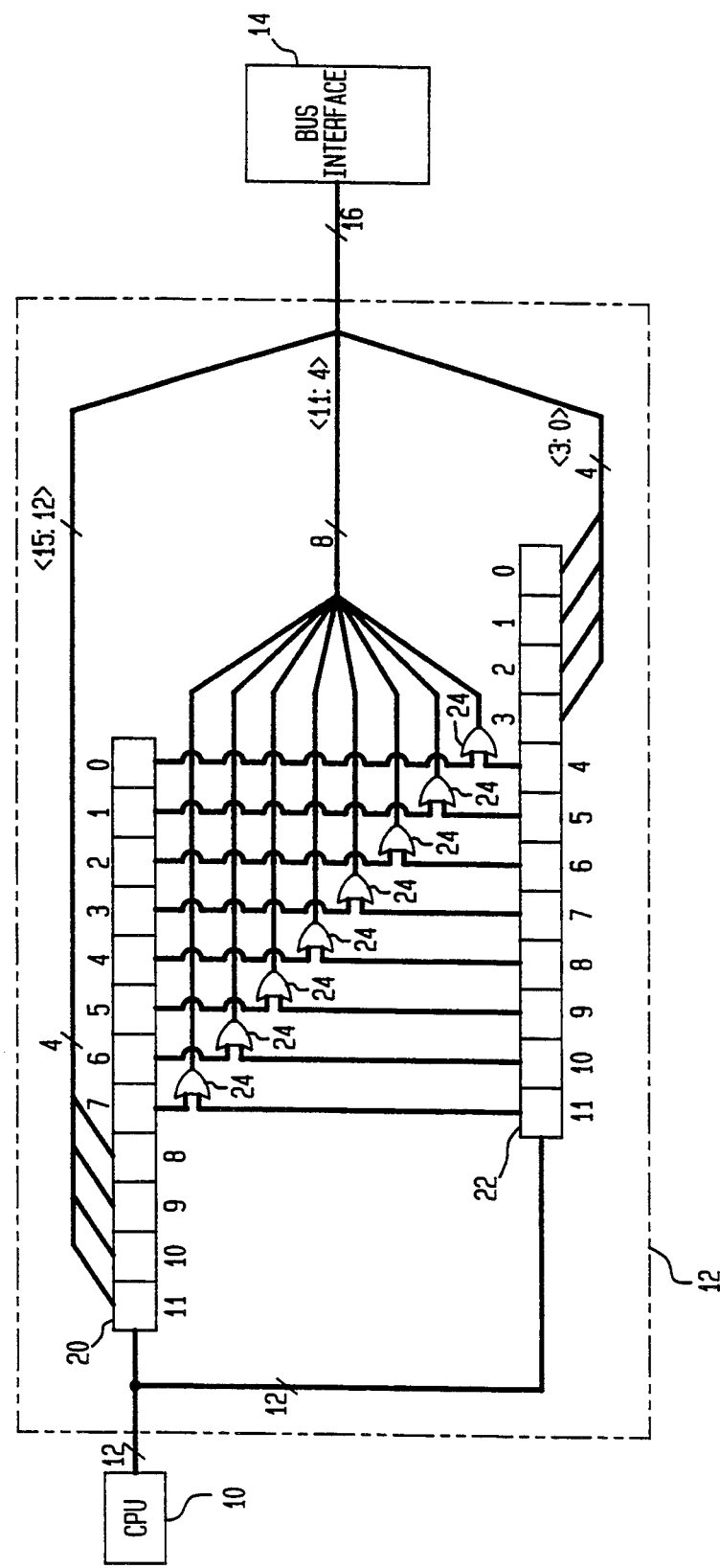
FIG. 2 is a block diagram of the register arrangement of FIG. 1.

Referring to FIG. 2, the address register device 12 of FIG. 1 is shown in greater detail. The address register device 12 comprises a 12-bit first or high register 20 and a 12-bit second or low register 22 which are ultimately combined together to form a 16 bit address. Portions of the two registers overlap (i.e., bits <7:0> of the high register 22 with bits <11:4> of the low register 22 in this example). Bits that overlap in the two registers are logically combined (e.g., logically ORed in this example) by a series of OR gates 24. In this embodiment, the 16 bit address for the backplane bus 16 (See FIG. 1) is formed from the four high order bits <11:8> of the high register 20 to provide bits <15:12> of the 16 bit address, the four low order bits <3:0> of the low register 22 to provide bits <3:0> of the 16 bit address and the resulting eight bits from the OR gate 24 outputs (logically combining bits <7:0> of the high register 20 with bits <11:4> of the low register 22) to provide the remaining bits <11:4> of the 16 bit address.

The setting of any of the bits <7:0> of the high register 20 to a logical zero causes the corresponding overlapped low order bits <11:4> to control the outputs of the respective OR gates 24. Moreover, the setting of any of bits <11:4> of the low register 22 to a logical zero causes the corresponding overlapped high order bits <7:0> to control the outputs of the respective OR gates 24.

Thus, for example, bits <11:8> of the high register 20 can be used to define sixteen segments of the 16 bit address space when bits <7:0> of the register 20 are set to logical zeros. Of course, bits <11:0> of the low register 22 will define an offset within the segment defined by bits <11:8> of the high register 20.

The following table illustrates each instance of the addressing scheme that can be used with the register arrangement illustrated in FIG. 2. In the table, the column identified by I sets forth, for each example, the overlapped bits of the high register 20 that are always set to logical zero; the column identified by II sets forth the overlapped bits of the low register 22 always set to logical zero; column III indicates the number of segments defined in the 16 bit address space as a result of the high and low order bits always set to logical zero, as listed in columns I and II, and finally, column IV indicates which bits of the low register 22 define an offset within each segment of the address space.

| I | II | III | IV |
|---|----|-----|----|
| none | <11:4> | 4K | <3:0> |
| <0> | <11:5> | 2K | <4:0> |
| <1:0> | <11:6> | 1K | <5:0> |
| <2:0> | <11:7> | 512 | <6:0> |
| <3:0> | <11:8> | 256 | <7:0> |
| <4:0> | <11:9> | 128 | <8:0> |
| <5:0> | <11:10> | 64 | <9:0> |
| <6:0> | <11> | 32 | <10:0> |
| <7:0> | none | 16 | <11:0> |

Accordingly, the overlapped bit arrangement for address registers affords considerable flexibility in setting the size of a memory segment via the high register 20 so that the CPU 10 can address locations within a segment of desired size through single register load operations to the low register 22.

The register arrangement 12 can also be used to alias addresses for use within a portion of a memory segment, by setting preselected overlapped high order bits to logical 1's. For example, bits <7:0> of the high order register 20 can each be set to a logical 1 so that bits <7:0> limit access to the upper portion of a memory segment defined by bits <11:8> and so on. The logical 1's set in bits <7:0> of the high register 20 control the outputs of the corresponding OR gates 24 to be logical 1's regardless of the values set in the corresponding overlapped low order bits <11:4> of the low register 22.

Thus, in this example, bits <11:4> of the low register 22 are irrelevant to the address output by the register arrangement 12 and bits <3:0> will provide an offset within the upper portion of the segment defined by bits <11:8> of the high order register 20. The CPU 10, however, can continue to generate values for the full 12 bits of the low register 22 without any need for new address generating software, with the logical 1's of the preselected overlapped high order bits aliasing the addresses for the appropriate location within the upper half of the segment defined by the high register 20. Thus, the CPU 80 can be programmed to write to the low register 22 without needing to know the content of the high register 20.

Referring now to FIG. 3, the addressing scheme of the present invention is illustrated in an example for generating a 32 bit bus address when the CPU has a 16 bit address bus. Several bits (e.g. 10) of each of two 16 bit registers are overlapped to provide a total of 22 bits of the address. In this example, longword access is described, however, one having skill in the art will appreciate that the present invention can be used for byte, word, longword, etc. access. Accordingly, the two low order bits of the address are set to zero values to accommodate the longword access (i.e., the individual bytes of each longword of the addressable space cannot be separately accessed). The remaining bits of the 32-bit address are supplied by an 8-bit base register. Corresponding bits that overlap in the high and low registers are logically combined (e.g., logically ORed together). Using this method, data structures of various sizes can be efficiently accessed provided that the structures are aligned to suitable addresses.

In this example, bits $H_9$-$H_0$ in the high address register are logically ORed with corresponding bits $L_{15}$-$L_6$ in the low address register.

The base register is set to a constant value equal to the eight high order address bits of a 16 Mbyte portion of the addressable space defined by the 32 bit address. A 64 Kilolongword address space can be efficiently accessed by first loading the bits $H_{15}$-$H_{10}$ of the high address register with the appropriate address of the selected 64 Kilolongword address space. Then, bits $H_9$-$H_0$ are loaded with binary zero values. Now, the entire low address register can be used to access any longword offset in the 64 Kilolongword address space without changing the high address register.

A 64 longword address space can also be easily accessed using the present invention. First, the entire high address register, bits $H_{15}$-$H_0$, is loaded with the appropriate address of the selected 64 longword address space. As long as bits $L_{15}$-$L_6$ are set to binary zero values, the bits $L_5$-$L_0$ of the low address register can be used to access any longword offset in the 64 longword address space without changing the high address register.

It will be appreciated by one having skill in the art that the addressing scheme shown in FIG. 3 may be used to access portions of the addressable space having other sizes. The shown addressing scheme can be used for any segment size for the addressable space from $2^6$ (64) longwords up to $2^{16}$ (65,536) longwords in length provided the length of the segment is a power of two and appropriate bits of the high register are set at constant values, e.g., logical zeros when OR gates are used. Also, different levels of overlapping between the two (or more) registers can be used to achieve desirable results. Using the method of the present invention, processor time is saved since only the low address register need be loaded with new address data when subsequently accessing the same segment of the addressable space specified by the high and base address registers.

Other logical functions can be used to combine overlapping bits besides an OR function. For instance, logically ANDing overlapping bits will achieve similar results. Referring to FIG. 3, when accessing a selected 64 Kilolongword address space, bits $H_{15}$-$H_{10}$ are again loaded with the appropriate high order address bits that point to this selected address space. Bits $H_9$-$H_0$ are loaded with binary 1 values which, in turn, are logically ANDed with overlapping bits $L_{15}$-$L_6$ of the low address register. Now, the entire low address register can be used to access any longword offset in the 64 Kilolongword address space without changing the high address register.

The high register can also be used to alias addresses, as described above, to cause accesses to the same location for two or more variations of the low register. Referring again to FIG. 3, the base register is set to a constant value equal to the eight high order address bits of a 16 Mbyte portion of the addressable space that includes 2 Megalongwords of space available to the device. Bits $H_{15}$-$H_{10}$ of the high address register are first loaded with the appropriate address of a selected 32 Kilolongword address space. Bit $H_9$ is set to a binary 1 value, and bits $H_8$-$H_0$ are loaded with binary zero values.

Because bit $H_9$ of the high address register is set to a binary 1 value, two binary values for the low address register will access the same location (i.e., Bit $L_{15}$ becomes a "don't care" variable).

This type of access to the same location has applications in computer network systems. For instance, a device may need to write to a series of locations in a cyclical manner. Rather than reload the low address register, it can be automatically incremented provided that the overlapping part of the high register has the appropriate binary 1 values. Referring back to FIG. 3, the base register and bits $H_{15}$-$H_{10}$ of the high register are set to the appropriate values to specify a 64 Klongword space that includes the aforementioned cycled series of locations (e.g., 64 longwords in length). Bits $H_9$-$H_0$ are set to binary 1 values. Now, the combination of the base and high registers should point to the first location of the cycled series of locations. Incrementing the low address register will cause the address to cycle through aforementioned series of locations in the 64 longword space.

What is claimed is:

1. A method of generating an address in a computer system, the address being represented by a first number of address bits, each unique value of the address corresponding to a unique memory location in the computer system, comprising the steps of:
- a) loading a first register with binary data, the first register including a first number of register storage locations, the first number of register storage locations being less than the first number of address bits;
- b) loading a second register with binary data, the second register including a second number of register storage locations, the second number of register storage locations being less than the first number of address bits;
- c) logically combining in a boolean operation a bit in each of a preselected third number of register storage locations of the first register only with a bit in each of a preselected equal number of corresponding register storage locations of the second register to generate an equal number of logical combination result bits;
- d) concatenating the logical combination result bits of step c, and binary data in the first and second registers not logically combined in step c to thereby generate the address represented by the first number of address bits.

2. The method of claim 1, further comprising:
- e) loading new binary data in the second register only; and
- f) changing the address represented by the first number of address bits by repeating steps c and d using the new binary data loaded in the second register.

3. The method of claim 1, wherein the first register includes binary locations for a high order portion of the address and the second register includes binary locations for a low order portion of the address.

4. The method of claim 3, wherein preselected ones of the third number of register storage locations are loaded with binary zero values.

5. The method of claim 4, wherein preselected ones of the third number of register storage locations in the second register are loaded with binary zero values, said preselected register storage locations corresponding to ones of the third number of register storage locations in the first register other than the preselected ones of the register storage locations in the first register which are loaded with binary zero values.

6. The method of claim 5, wherein the binary data of the first register not logically combined in step c correspond to highest order address bits of a segment of memory locations in the computer system.

7. The method of claim 6, wherein in step c, the logically combined binary data is combined using a logical OR function.

8. The method of claim 3, wherein preselected ones of the third number of register storage locations are loaded with binary 1 values.

9. The method of claim 8, wherein the binary data of the first register not logically combined in step c corresponds to highest order address bits of a segment of memory locations in the computer system.

10. The method of claim 3, wherein before step d the method further comprises:
- e) loading a third register with binary data as a portion of the address represented by the first number of address bits, the third register including a fourth number of register storage locations, the fourth number of register storage locations being less than the first number of address bits; and
- f) wherein step d includes
  concatenating the logically combined data of step c, binary data in the third register and binary data in the first and second registers not logically combined in step c to thereby generate the address represented by the first number of address bits.

11. The method of claim 10, wherein in step c, the logically combined binary data is combined using a logical OR function.

12. An apparatus for generating an address to locate a location in a memory, comprising:
- a first register having a first number of register storage locations for storage of a first number of address bits;
- a second register having a second number of register storage locations for storage of a second number of address bits; and
- a logic device coupled to each of the first and second registers for logically combining in a boolean operation a bit in each of a preselected third number of register storage locations of the first register only with a bit in each of a preselected equal number of corresponding register storage locations of the second register to provide an equal number of logically combined address bits;
- whereby the address to locate a location in a memory, comprises the logically combined address bits and address bits of the first and second address bits other than the bits of the preselected third number of register storage locations in each of the first and second registers.

13. The apparatus of claim 12, wherein the logic device comprises a set of OR gates.

14. A method of generating an address in a computer system, the address being represented by a first number of address bits, each unique value of the address corresponding to a unique memory location in the computer system, comprising the steps of:
- a) loading a first register with binary data, the first register including a first number of register storage locations, the first number of register storage locations being less than the first number of address bits;
- b) loading a second register with binary data, the second register including a second number of register storage locations, the second number of register storage locations being less than the first number of address bits;
- c) logically combining binary data in a preselected third number of register storage locations of the first register and binary data in an equal number of corresponding register storage locations of the second register, wherein individual binary data from each of the register storage locations of the first register is logically combined in a single boolean operation with individual binary data from each of the corresponding register storage locations of the second register;
- d) concatenating the logically combined data of step c, and binary data in the first and second registers not logically combined in step c to thereby generate the address represented by the first number of address bits.

* * * * *